United States Patent
Cha

(10) Patent No.: US 9,506,517 B2
(45) Date of Patent: Nov. 29, 2016

(54) HYBRID INNER CORE ASSEMBLY OF HONEYCOMB STRUCTURE AND MANUFACTURING METHOD THEREOF

(71) Applicant: HYUNDAI MOBIS CO., LTD., Seoul (KR)

(72) Inventor: Seung-Hwan Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/820,837

(22) Filed: Aug. 7, 2015

(65) Prior Publication Data

US 2016/0052357 A1 Feb. 25, 2016

(30) Foreign Application Priority Data

Aug. 20, 2014 (KR) .................. 10-2014-0108275

(51) Int. Cl.
*B60G 11/22* (2006.01)
*F16F 1/38* (2006.01)
*B60G 7/00* (2006.01)

(52) U.S. Cl.
CPC ............. *F16F 1/3863* (2013.01); *B60G 7/008* (2013.01); *B60G 2204/41* (2013.01); *B60G 2204/4104* (2013.01)

(58) Field of Classification Search
CPC ........ B60G 11/22; B60G 7/008; F16F 1/3863
See application file for complete search history.

(56) References Cited

U.S. PATENT DOCUMENTS

| 5,846,014 A * | 12/1998 | Arthur .................. F16C 27/063 105/139 |
| 2006/0186590 A1* | 8/2006 | McLaughlin .......... B60G 11/12 267/293 |
| 2009/0060640 A1* | 3/2009 | Vogler .................. F16F 1/3842 403/135 |
| 2012/0098226 A1* | 4/2012 | Rodecker ........... B60G 21/0551 280/124.106 |

FOREIGN PATENT DOCUMENTS

| KR | 10-2002-0078282 A | 10/2002 |
| KR | 10-2003-0050610 A | 6/2003 |
| KR | 10-2005-0113652 A | 12/2005 |

* cited by examiner

*Primary Examiner* — Vishal Sahni
(74) *Attorney, Agent, or Firm* — NSIP Law

(57) ABSTRACT

A hybrid assembly of a honeycomb structure is provided. The assembly includes a steel plate capable of being mounted on a vehicle body, a steel core into which the steel plate is inserted in order for both ends of the steel plate along the longitudinal direction thereof to be protruded through the steel core, and a plastic core having an inner portion formed with a honeycomb shape into which the steel core is inserted at a central axis along a longitudinal direction thereof.

8 Claims, 5 Drawing Sheets

+

HYBRID INNER CORE ASSEMBLY OF HONEYCOMB STRUCTURE AND MANUFACTURING METHOD THEREOF

CROSS-REFERENCE TO RELATED APPLICATION

This application claims the benefit under 35 USC 119(a) of Korean Patent Application No. 10-2014-0108275, filed on Aug. 20, 2014 in the Korean Intellectual Property Office, the entire disclosure of which is incorporated herein by reference for all purposes.

BACKGROUND

1. Field

The present application relates to a hybrid inner core assembly of a honeycomb structure, and manufacturing method thereof, for providing a hybrid type inner pipe compounded with steel and plastic.

2. Description of Related Art

In general, the suspension system of a vehicle prevents a vehicle body or goods from being damaged by absorbing and reducing vibration or impact caused by a road while travelling so as to avoid a direct transmission of the vibration and the impact to the vehicle body, thereby improving riding comfort. The suspension system of the vehicle can be divided into a front suspension system and a rear suspension system.

An end of a trailing arm included in the rear suspension system is formed with a through-hole of a prescribed size. A trailing arm bushing, which is formed to relieve vibration or impact received from the road and to minimize the transmission of the vibration and the impact to the vehicle body, is press-fitted into the through-hole to be installed.

FIGS. 1A and 1B are a perspective view and an exploded perspective view of a trailing arm bushing according to the prior art.

Referring to FIGS. 1A and 1B, the figures show a blade type trailing arm bushing 1 of the prior art. As shown, the trailing arm bushing is manufactured by a process in which a core type inner pipe 2, manufactured by a steel forging process, is inserted into a rubber bushing 3 and then the rubber bushing 3 is inserted into an outer pipe 4.

However, there is a disadvantage in the prior art in that the core type inner pipe 2 is heavy, thereby decreasing the fuel efficiency of the vehicle.

Furthermore, in a case in which the inner pipe 2 is manufactured by an aluminum die casting process in order to reduce the weight, it needs to be manufactured to be thicker in order to obtain the same strength as steel, which lowers its toughness, and causes the manufacturing costs to increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a hybrid assembly of a honeycomb structure may include a steel plate capable of being mounted on a vehicle body, a steel core into which the steel plate is inserted in order for both ends of the steel plate along the longitudinal direction thereof to be protruded through the steel core, and a plastic core having an inner portion formed with a honeycomb shape into which the steel core is inserted at a central axis along a longitudinal direction thereof.

The assembly may include mounting holes for coupling with a vehicle body formed at the both ends along a longitudinal direction of the steel plate.

The assembly may include locking jaws for preventing the steel core from being separated from the plastic core formed at the both ends of the steel score.

The assembly may include a plurality of vertical plates perpendicular to the longitudinal central axis of the plastic core and a plurality of horizontal plates horizontal to the longitudinal central axis of the plastic core formed with an inner side of the plastic core, the vertical plates and the horizontal plates connected with each other to form a honeycomb shape.

The assembly may include a rubber bushing into which the plastic core is inserted, and an outer pipe into which the rubber bushing is inserted.

In another general aspect, a method of manufacturing a hybrid assembly of a honeycomb structure may include an injection step of manufacturing a plastic core into which a steel core is inserted by injecting synthetic resin into a mold equipped with the steel core, and a press-fitting step of press-fitting a steel plate formed with mounting holes at both ends thereof into the steel core, wherein an inner portion of the plastic core is formed with honeycomb shape.

The method may be such that the inner portion of the plastic core is cut to form the honeycomb shape therein after the injection step.

The method may include a plurality of pins horizontal to the steel core formed in the inner portion of the mold such that the inner portion of the plastic core can be formed with the honeycomb shape.

The method may include a rubber bushing mounting step of press-fitting the plastic core into a rubber bushing, and an outer pipe mounting step of inserting the rubber bushing into which the plastic core is press-fitted into an inner portion of the outer pipe, wherein the rubber bushing mounting step and the outer pipe mounting step are performed after the steel plate is press-fitted into the steel core.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

Features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1A:
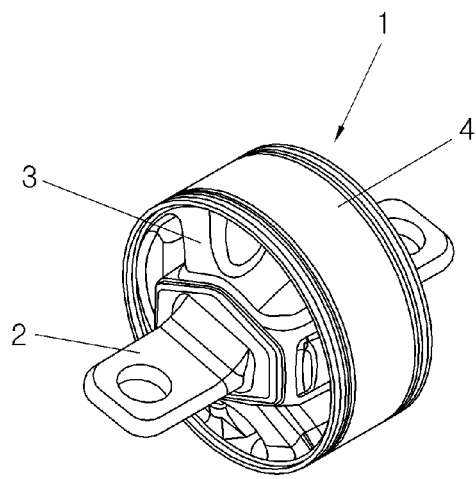
FIGS. 1A and 1B are a perspective view and an exploded perspective view of a trailing arm bushing according to the prior art.
Figure 1B:
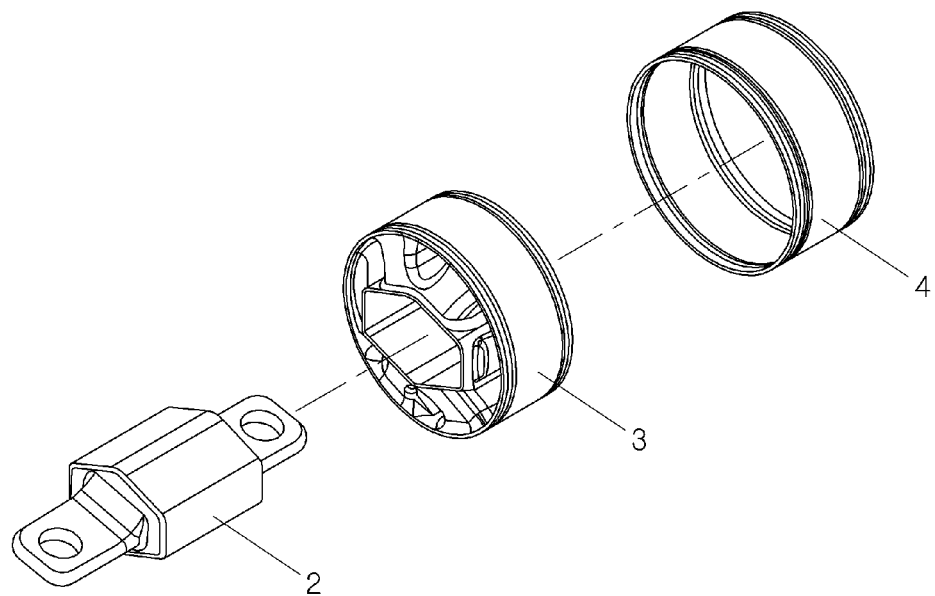
Figure 2A:
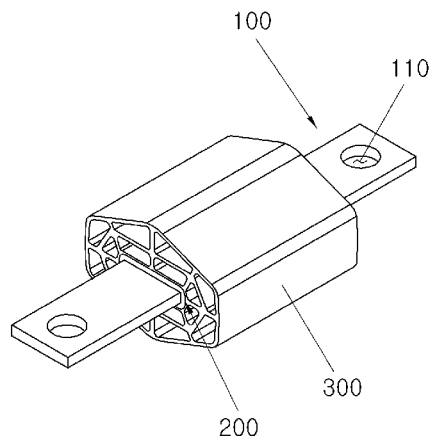
FIGS. 2A, 2B and 2C are perspective views and a partial cross-sectional view illustrating an example of a hybrid inner core assembly of a honeycomb structure.
Figure 2B:
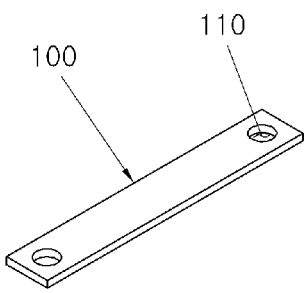
Figure 2C:
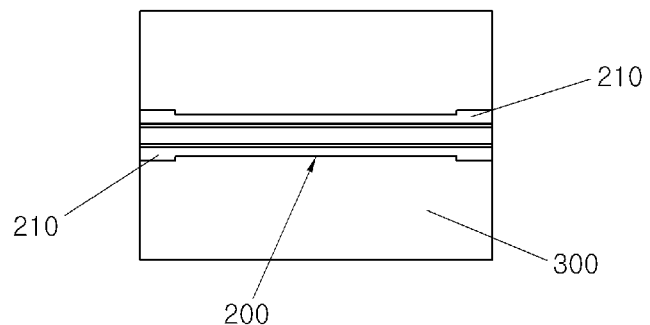

FIGS. 2A, 2B and 2C are a perspective view and a partial cross-sectional view illustrating an example of a hybrid inner core assembly of a honeycomb structure.

As shown in FIGS. 2A, 2B and 2C, a hybrid inner core assembly of a honeycomb structure according to an embodiment of the present application may include a steel plate 100 capable of being mounted on a vehicle body, a steel core 200 into which the steel plate 100 is inserted in order for both ends of the steel plate 200 along the longitudinal direction thereof to be protruded through the steel core 200, and a plastic core 300 whose an inner portion is formed with honeycomb shape and into which the steel core 200 is inserted at a central axis along the longitudinal direction.

The steel plate 100 may be manufactured in order for long sides thereof to be a rectangular shape by using a press process or an extrusion process. Mounting holes 110 for coupling with the vehicle body may be formed at the both ends along the longitudinal direction thereof.

The steel core 200 may be formed with a tubular shape into which the steel plate 100 is inserted and manufactured in a hexahedral shape whose both ends along the longitudinal direction having the height smaller than the width of the long sides are opened. Locking jaws 210 may be formed at the both ends of the steel score 200 in order to prevent the steel core 200 from being separated from the plastic core 300. By providing the steel core 200 with locking jaws 210, the movement of the plastic core 300 can be controlled by the steel core 200.

The locking jaws 210 may be formed to be protruded from the long sides of the steel core 200 and to preferably have a predetermined width.

At an inner side of the plastic core 300 may be formed a plurality of vertical plates 320 (shown in FIG. 4) perpendicular to the longitudinal central axis of the plastic core 300 and a plurality of horizontal plates 310 (shown in FIG. 4) horizontal to the longitudinal central axis of the plastic core 300. The vertical plates 320 and the horizontal plates 310 are connected with each other to form a honeycomb shape.

By the honeycomb shape formed at the inner side of the plastic core 300, the inner pipe may be to meet the required stiffness and strength.

The hybrid inner core assembly of honeycomb structure according to an embodiment of the present application may further include a rubber bushing 400 into which the plastic core 300 is inserted therein and an outer pipe 500 into which the rubber bushing 400 is inserted therein.

The rubber bushing 400 may be formed with a donut shape having an inner diameter into which the plastic core 300 can be inserted and an outer diameter contacted with the outer pipe 500 when the rubber bushing 400 is inserted into the inner side of the outer pipe 500. A plurality of holes may be formed between the inner diameter and the outer diameter in order to reduce vibration transmitted to the rubber bushing 400 with elasticity of the rubber bushing 400.

The manufacturing method of hybrid inner core assembly of honeycomb structure configured as above according to another embodiment of the present application will be described as follows.

Figure 3:
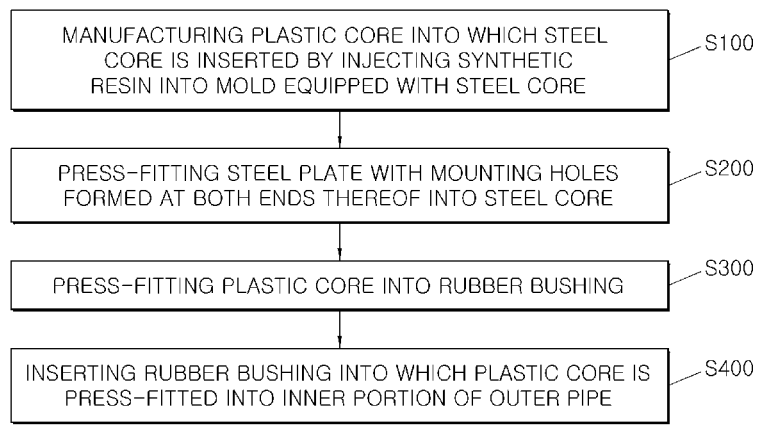
FIG. 3 is a flow chart illustrating an example of a manufacturing method of a hybrid inner core assembly of a honeycomb structure.
Figure 3:
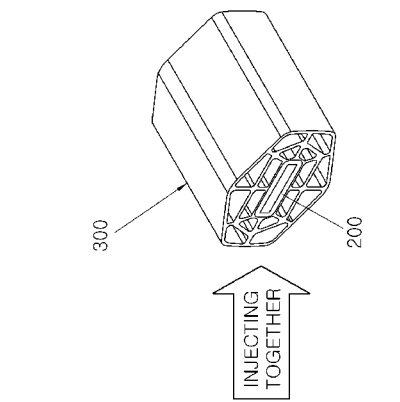

FIG. 3 is a flow chart illustrating an example of a manufacturing method of a hybrid inner core assembly of a honeycomb structure.

Referring to FIG. 3, and as shown in FIGS. 3 to 6B, the manufacturing method of the hybrid inner core assembly of the honeycomb structure according to an embodiment of the present application may include an injection step (S100) of manufacturing the plastic core 300 into which the steel core 200 is inserted by injecting synthetic resin into a mold equipped with the steel core 200, and a press-fitting step (S200) of press-fitting the steel plate 100 formed with mounting holes 110 at both ends thereof. The inner portion of the plastic core 300 may be formed with honeycomb structure.

Figure 4:
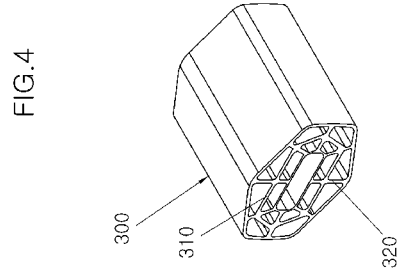
FIG. 4 is a perspective view illustrating an example of a steel core and a plastic core in an injection step according to a manufacturing method of a hybrid inner core assembly of a honeycomb structure.
Figure 4:
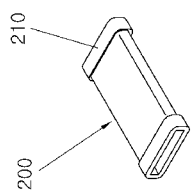

FIG. 4 is a perspective view illustrating an example of a steel core and a plastic core in an injection step according to a manufacturing method of a hybrid inner core assembly of a honeycomb structure.

Referring to FIG. 4, the injection step (S100 of FIG. 3) is, as shown in FIG. 4, a step of disposing the steel core 200 into the mold and then injecting synthetic resin into the mold such that the steel core 200 is inserted into the plastic core 300.

In order for the inner portion of the plastic core 300 to form the honeycomb structure, the inner portion of the plastic core 300 may be cut after the injection step (S100 of FIG. 3). A plurality of pins horizontal to the steel core 200 may be formed in an inner portion of the mold so that the inner portion of the plastic core 300 can be formed with the honeycomb shape without any process after the injection step (S100 of FIG. 3).

In an embodiment of the present application, the plurality of pins may be formed in the inner portion of the mold such that the inner portion of the plastic core 300 is formed with the honeycomb shape when injecting.

Figure 5:
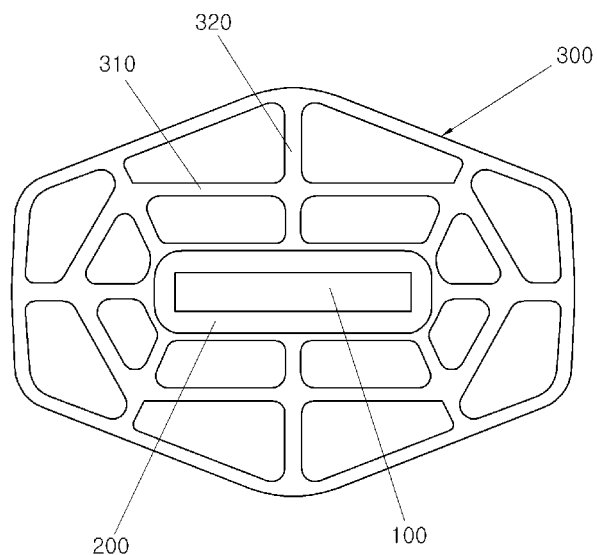
FIG. 5 is a cross-sectional view illustrating an example in which a steel plate is press-fitted into a steel core in a press fitting step according to a manufacturing method of a hybrid inner core assembly of a honeycomb structure.

FIG. 5 is a cross-sectional view illustrating an example in which a steel plate is press-fitted into the steel core in a press fitting step according to the manufacturing method of the hybrid inner core assembly of the honeycomb structure.

Referring to FIG. 5, the steel plate 100 may be press-fitted into the steel core 200 in the press-fitting step (S200 of FIG. 3). It may be preferable to cool the steel plate 100 in a cryogenic process and then press-fit the cooled steel plate 100 into the steel core 200.

Figure 6A:
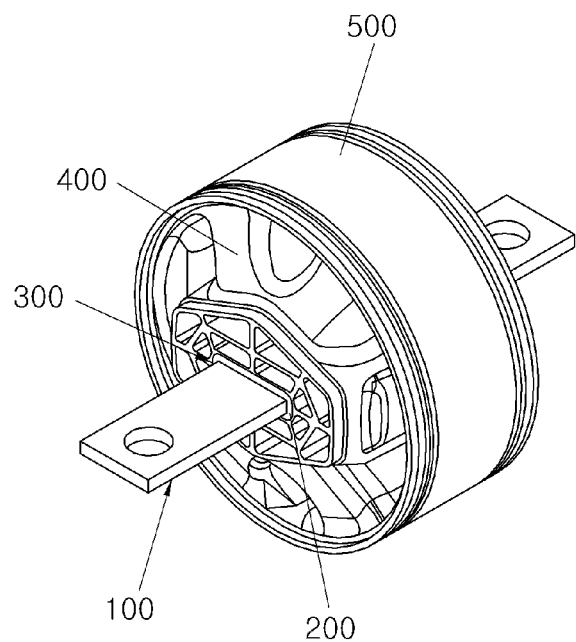
FIGS. 6A and 6B are a perspective view and a front view illustrating an example of a trailing arm bushing manufactured in a manufacturing method of a hybrid inner core assembly of a honeycomb structure.
Figure 6B:
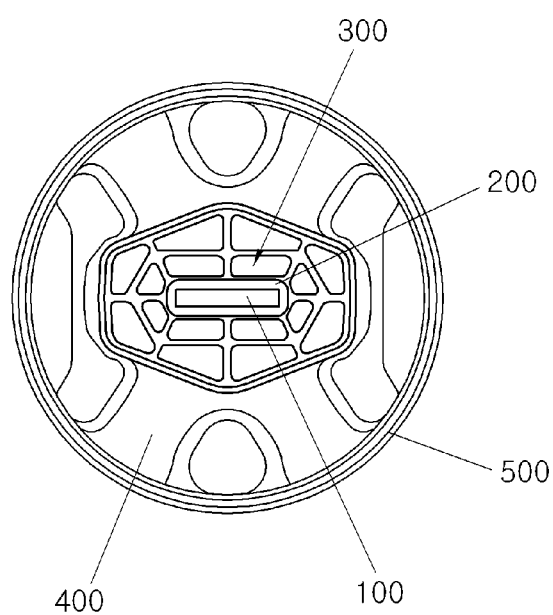

FIGS. 6A and 6B are a perspective view and a front view illustrating an example of a trailing arm bushing manufactured in a manufacturing method of the hybrid inner core assembly of the honeycomb structure.

Referring to FIGS. 6A and 6B, embodiments of the present application may further include a rubber bushing mounting step (S300 of FIG. 3) of press-fitting the plastic core 300 into the rubber bushing 400 and an outer pipe mounting step (S400 of FIG. 3) of inserting the rubber bushing 400 into which the plastic core 300 is press-fitted into an inner portion of the outer pipe 500.

In the rubber bushing mounting step (S300 of FIG. 3), the plastic core 300 may be inserted into an inner portion of inner diameter portion in the rubber bushing 400 by using the elasticity of the rubber bushing 400, and also, in the outer pipe mounting step (S400 of FIG. 3), the rubber bushing 400 may be inserted into an inner portion of inner diameter portion in the outer pipe 500 by using the elasticity of the rubber bushing 400.

What is claimed is:

1. A hybrid assembly of a honeycomb structure, the assembly comprising:
    a steel plate capable of being mounted on a vehicle body;
    a steel core into which the steel plate is inserted in order for both ends of the steel plate along a longitudinal direction thereof to be protruded through the steel core; and
    a plastic core having an inner portion formed with a honeycomb shape into which the steel core is inserted at a central axis along a longitudinal direction thereof,
    wherein a plurality of vertical plates perpendicular to the longitudinal central axis of the plastic core and horizontal plates horizontal to the longitudinal central axis of the plastic core are formed with an inner side of the plastic core,
    wherein the vertical plates and the horizontal plates are connected with each other to form the honeycomb shape, and
    wherein the vertical plates and the horizontal plates cross each other.

2. The assembly of claim 1, wherein mounting holes for coupling with a vehicle body are formed at both ends along a longitudinal direction of the steel plate.

3. The assembly of claim 1, wherein locking jaws for preventing the steel core from being separated from the plastic core are formed at both ends of the steel core.

4. The assembly of claim 1, further comprising:
    a rubber bushing into which the plastic core is inserted; and
    an outer pipe into which the rubber bushing is inserted.

5. A method of manufacturing a hybrid assembly of a honeycomb structure, the method comprising:
    an injection step of manufacturing a plastic core into which a steel core is inserted by injecting synthetic resin into a mold equipped with the steel core; and
    a press-fitting step of press-fitting a steel plate formed with mounting holes at both ends thereof into the steel core;
    wherein an inner portion of the plastic core is formed with a honeycomb shape, and
    wherein a plurality of vertical plates perpendicular to the longitudinal central axis of the plastic core and horizontal plates horizontal to the longitudinal central axis of the plastic core are formed with an inner side of the plastic core,
    wherein the vertical plates and the horizontal plates are connected with each other to form the honeycomb shape, and
    wherein the vertical plates and the horizontal plates cross each other.

6. The method of claim 5, wherein the inner portion of the plastic core is cut to form the honeycomb shape therein after the injection step.

7. The manufacturing method of claim 5, wherein a plurality of pins horizontal to the steel core is formed in the inner portion of the mold such that the inner portion of the plastic core can be formed with the honeycomb shape.

8. The manufacturing method of claim 5, further comprising:
    a rubber bushing mounting step of press-fitting the plastic core into a rubber bushing; and
    an outer pipe mounting step of inserting the rubber bushing into which the plastic core is press-fitted into an inner portion of an outer pipe,
    wherein the rubber bushing mounting step and the outer pipe mounting step are performed after the steel plate is press-fitted into the steel core.

* * * * *